US012711283B1

(12) United States Patent
Sherred

(10) Patent No.: US 12,711,283 B1
(45) Date of Patent: Aug. 18, 2026

(54) SYSTEMS AND METHODS FOR MEMORY RANDOMIZATION

(71) Applicant: Cadence Design Systems, Inc., San Jose, CA (US)

(72) Inventor: Mark Sherred, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 456 days.

(21) Appl. No.: 17/730,809

(22) Filed: Apr. 27, 2022

(51) Int. Cl.
*G06F 21/79* (2013.01)
*G06F 1/30* (2006.01)
*G06F 21/60* (2013.01)
*G06F 30/331* (2020.01)
*G06F 30/333* (2020.01)
*G06F 21/10* (2013.01)

(52) U.S. Cl.
CPC ................ *G06F 21/79* (2013.01); *G06F 1/30* (2013.01); *G06F 21/602* (2013.01); *G06F 30/331* (2020.01); *G06F 30/333* (2020.01); *G06F 21/107* (2023.08)

(58) Field of Classification Search
CPC .......... G06F 21/79; G06F 1/30; G06F 21/602; G06F 30/331; G06F 30/333; G06F 21/107
USPC .......................................................... 726/26
See application file for complete search history.

(56) References Cited

U.S. PATENT DOCUMENTS 5,237,699 A * 8/1993 Little ........................ G06F 1/30 714/23
7,200,235 B1 * 4/2007 Trimberger ........... H04L 9/0897 326/38
8,549,367 B1 * 10/2013 Sherred .................. G11C 29/10 714/719
11,138,346 B2 * 10/2021 Gulati ..................... G06F 21/78
2006/0015946 A1 * 1/2006 Yagawa .................. G06F 21/80 726/32
2008/0155273 A1 * 6/2008 Conti .................. G06F 12/1408 711/E12.092
2013/0145177 A1 * 6/2013 Cordella ................. G06F 21/78 713/193
2015/0002900 A1 * 1/2015 Cochran ............... H04L 9/0891 358/1.16
2019/0347213 A1 * 11/2019 Lutz ...................... G06F 21/602
2021/0218566 A1 * 7/2021 Mastenbrook ........ H04L 9/3271
2021/0312055 A1 * 10/2021 Kloth ..................... H04L 9/0866
2021/0367769 A1 * 11/2021 Medaglia ................ G06F 21/57
2023/0350580 A1 * 11/2023 Kerstetter ............... G06F 21/79
2024/0086336 A1 * 3/2024 Kim .................... G06F 12/1408

* cited by examiner

*Primary Examiner* — Catherine Thiaw
*Assistant Examiner* — Nega Woldemariam
(74) *Attorney, Agent, or Firm* — Foley & Lardner LLP

(57) ABSTRACT

This disclosure relates to memory randomization of a memory model during functional verification of a user design model. In an example, a computer-implemented method can include encrypting write data according to a first key before a power cycle of the memory model, storing the encrypted write data at a respective memory location of the memory model, removing or causing power to be removed from the memory model to power cycle the memory model, providing or causing the power to be provided back to the memory model to power the memory model, and decrypting the encrypted write data stored at the respective memory location of the memory model using a second key to provide decoded data in response to the memory model being powered back on.

7 Claims, 4 Drawing Sheets

SYSTEMS AND METHODS FOR MEMORY RANDOMIZATION

TECHNICAL FIELD

The present disclosure relates to memory randomization during functional verification of a design.

BACKGROUND

In integrated circuit (IC) design, hardware emulation is a process of imitating the behavior of one or more pieces of hardware (typically a system under design) with another piece of hardware, typically a special purpose emulation system. The emulation model is usually based on a hardware description language (e.g., Verilog) source code, which is compiled into the format used by an emulation system. The goal is normally debugging and functional verification of the system being designed. In electronic design automation, functional verification is a task of verifying that a logic design conforms to a specification. Functional verification is a part of more encompassing design verification, which, besides functional verification, considers non-functional aspects like timing, layout, and power.

SUMMARY

In an example, a computer-implemented method for memory randomization during functional verification of user design model that includes a memory model can include encrypting write data according to a first key before a power cycle of the memory model, storing the encrypted write data at a respective memory location of the memory model, removing or causing power to be removed from the memory model to power cycle the memory model, providing or causing the power to be provided back to the memory model to power the memory model, and decrypting the encrypted write data stored at the respective memory location of the memory model using a second key to provide decoded data in response to the memory model being powered back on.

In yet another example, a system can include a non-transitory computer-readable medium configured to store data that can include a first key and a second key, and instructions. The system can further include a processor configured to access the non-transitory computer-readable medium and execute the instructions. The instructions can include an emulation tool that can be programmed to emulate a user design model that can include a memory model to emulate a functionality of the user design model, and a random memory optimizer that can be programmed to simulate data memory loss at the memory model during emulation of the user design model. The random memory optimizer can be programmed to encrypt write data according to the first key for storage at a respective memory location of the memory model, remove or cause power to be removed from the memory model to power cycle the memory model. provide or cause the power to be provided back to the memory model to power the memory model, and decrypt the encrypted data stored at the respective memory location of the memory model using the second key to provide decoded data in response to the memory model being powered back on.

In a further example, a non-transitory machine readable medium can include machine executable instructions. The machine executable instructions can include a random memory optimizer. The random memory optimizer can include encrypt logic to encrypt write data according to a first key before a power cycle of a memory model during an emulation of a user design model that can include the memory model. The encrypt logic can store the encrypted write data at a respective memory location of the memory model during the emulation of the user design model. The random memory optimizer can further include key generator logic that can provide the first key for encrypting the write data before the power cycle of the memory model during the emulation of the user design model. The key generator logic can provide a second key for decrypting the encrypted write data stored at the respective memory location of the memory model after the power cycle of the memory during the emulation of the user design model. The random memory optimizer can further include decode logic to decrypt the encrypted write data stored at the respective memory location of the memory model using the second key to provide decoded data after the power cycle of the memory model during the emulation of the user design model.

DETAILED DESCRIPTION

Figure 1:
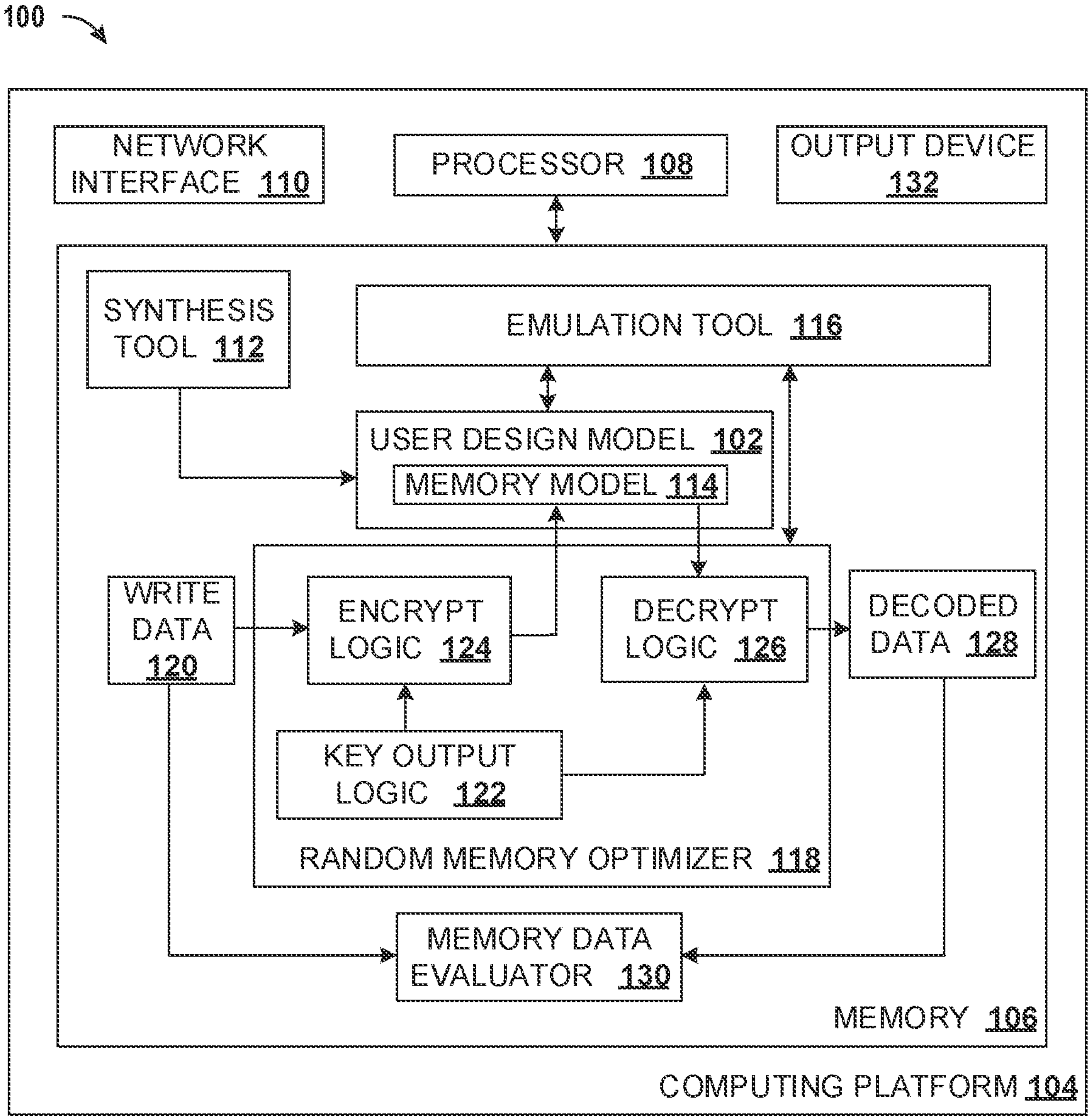
FIG. 1 illustrates an example of a system for emulating a user design model.

The present disclosure relates to random memory optimization. User design models generally include one or more memory locations that can be loaded with data. For example, a user design model may be representative of a mobile device (e.g., a cellphone, a tablet, etc.), a central processing unit (CPU), a graphical processing unit (GPU), or another type of device or circuit. The user design can be tested during development to verify a functionality of the user design model (e.g., known as a functional verification test), for example, before the user design model is fabricated. Fabricated user designs (e.g., a fabricated IC) may turn off power to portions of the design. For example, a mobile device can be configured with circuitry in different power domains such that circuitry in a respective power domain is turned off when desired (e.g., when the phone is not in use) to save battery power or reduce heat generation of the mobile device. By way of further example, display memory of a mobile device when the mobile device is not in use is generally in a low-power state to save battery and reduce heat dissipation. A low-power state can refer to a state in which a device or circuit is not operating at a set or desired operating voltage. Thus, a low-power state as used herein can refer to operating a device or circuit in an off-state (e.g., during which the device or circuit does not receive an operating voltage) or in a reduced-state (e.g., during which the device or circuit receives a reduced operating voltage).

While flash memory retains data values when powered off and powered back on, other types of memories such as random access memory (RAM) are set to undetermined data values when power is removed and restored. Modeling information or data memory loss for RAM in a software domain during user design development is challenging as emulation software needs to be stopped to write zeros or random values to respective memory locations of a memory model of the RAM during a power cycle to represent data memory loss. This process is time-consuming since a user design model may have many memory locations. Systems and methods are described herein for modeling a data memory loss condition during functional verification testing of a user design model based on a user design.

For example, during a user design emulation, an emulation tool (e.g., stored as machine readable instructions in memory) can be invoked (e.g., in response to a user input or another software logic module). The emulation tool can emulate a memory model of the user design model in the software domain. During the emulation of the memory model, a random memory optimizer (e.g., stored as machine readable instructions in the memory) can be programmed to simulate a data loss condition at the memory model of the user design model in response to a power cycle. The random memory optimizer can be programmed to randomize data stored in one or more memory locations of the memory model with random values to simulate memory loss resulting from a power cycle of the memory in a physical instantiation of the memory based on the memory model.

The random memory optimizer can be programmed to encrypt write data to be stored at a respective memory location of the memory model using a first key. In some instances, the random memory optimizer can be programmed to retrieve the first key from a key register as described herein. Any encryption technique can be used to encrypt the write data as described herein using a key. The encrypted write data can be stored at the respective memory location of the memory model. Each memory location in each memory model can be encrypted with a similar first key or different first keys. The memory model can be associated with or located in a respective power domain of the user design based on the user design model. In some instances, during the user design emulation, the emulation tool can simulate a removal of power from the memory model to power off the memory model. In some examples, the random memory optimizer can be programmed to cause the power to be removed from the memory model.

When power is removed from the memory model or in response to removing the power from the memory model, the random memory optimizer can be programmed to retrieve from the key register a second key that is different from the first key. In some instances, the random memory optimizer can be programmed to retrieve the second key when power is restored to the respective memory model. When power is provided back to the memory model, the random memory optimizer can be programmed to decrypt the encrypted write data stored at the respective memory location with the second key. Because a different key is used to decrypt the encrypted data stored at the respective memory location this has an effect of writing a random value to the respective memory location without doing a write operation to the respective memory location. Thus, the systems and methods described herein allow for simulating a memory loss condition in the software domain in real-time without pausing or stopping the emulation tool as in other existing technologies. The examples described herein can be used to model data memory loss of a memory model during functional verification testing of the user design model. Accordingly, the examples herein enable a user to randomize data stored in the memory model with random values to simulate memory loss resulting from a power cycle of the memory model.

FIG. 1 illustrates an example of a system 100 for simulating a user design model 102. The system 100 can include a computing platform 104. The computing platform 104 can include memory 106 for storing machine readable instructions and data and a processing unit 108 for accessing the memory 106 and executing the machine readable instructions. The memory 106 represents a non-transitory machine-readable memory (or other medium), such as RAM, a solid state drive, a hard disk drive, or a combination thereof. The processing unit 108 can be implemented as one or more processor cores. The computing platform 104 can include a network interface 110 (e.g., a network interface card) configured to communicate with other computing platforms via a network, such as a public network (e.g., the Internet), a private network (e.g., a local area network (LAN)) or a combination thereof (e.g., a virtual private network).

The computing platform 104 could be implemented in a computing cloud. In such a situation, features of the computing platform 104, such as the processing unit 108, the memory 106, and the network interface 110 could be representative of a single instance of hardware or multiple instances of hardware with applications executing across the multiple of instances (e.g., distributed) of hardware (e.g., computers, routers, memory, processors, or a combination thereof). Alternatively, the computing platform 104 could be implemented on a single dedicated server or workstation.

The user design model 102 can be stored in the memory 106 of the computing platform 104. The user design model 102 can be implemented, for example, as design specifications for an IC chip model. Thus, the user design model 102 can in some instances correspond to an IC design model. The user design model 102 can be generated with an EDA application, such as a synthesis tool 112. The synthesis tool 112 can be implemented as application software or a software module. In the example of FIG. 1, the synthesis tool 112 is executed on the computing platform 104, however, in other examples, the synthesis tool 112 can be executed on a remote system (not shown in FIG. 1). For instance, an end-user of the EDA application can employ a user interface to generate and/or modify hardware description language (HDL) code (e.g., Verilog) for generating a register-transfer level (RTL) model (e.g., RTL code) characterizing a user design (e.g., a circuit). The RTL model can be transformable by the synthesis tool 112 into a physically realizable gate-level netlist for the user design model 102.

The user design model 102 includes a memory model 114. The memory model 114 may be representative of a physical memory device that can be instantiated based on the memory model 114. The memory device can be implemented as a double data rate 3 (DDR3) device, a double data rate 4 (DDR4) device, a low power DDR3 (LPDDR3) device, a low power DDR4 (LPDDR4) device, a Wide I/O 2 (WIO2) device, a high bandwidth memory (HBM) dynamic random-access memory (DRAM) device, HBM 2 DRAM (HBM2 DRAM) device a double data rate 5 (DDR5) device, and a low power DDR5 (LPDDR5) device (e.g., mobile DDR). The memory device that can be represented in a virtual environment by the memory model 114 can be any type of RAM device.

The memory 106 includes an emulation tool 116. The emulation tool 116 can be programmed to provide an emulation environment for emulating the user design model 102. For example, the emulation tool 116 can be used to emulate a functionality of the user design model 102 to verify a functional behavior of the user design based on the user design model 102. During the emulation of the user design model 102, a random memory optimizer 118 can be invoked. In some examples, the random memory optimizer 118 can be invoked by an EDA tool or module during the emulation of the user design model 102. In other examples, the emulation tool 116 can invoke the random memory optimizer 118 for memory randomization of the memory model 114.

During the emulation of the user design model 102, it may desirable to power cycle the memory model 114. The term "power cycle" as used herein can refer to removing power from a memory model for a period of time and providing power back to the memory model after the period of time during an emulation of the memory model. The memory model 114 can be associated with (e.g., logically linked) or located in a respective power domain. The term "power domain" as used herein can refer to a logical partitioning of circuitry and/or device models for a user design that is to receive a similar operating voltage during an emulation of the circuitry and/or device models. While the example of FIG. 1 illustrates a single memory model there can be any number of memory models and each memory model can have a respective random memory optimizer that can be implemented similar to the random memory optimizer 118. In other examples, one or more models can be associated with a respective random memory optimizer.

The random memory optimizer 118 can be used to simulate or model data memory loss during functional verification testing of the memory model 114. The random memory optimizer 118 can be programmed to simulate data loss at the memory model 114 by randomizing content at one or more memory locations of the memory model 114. The random memory optimizer 118 can be programmed to cause the memory model 114 to resemble a behavior of a fabricated memory based on the memory model 114 such that when the memory model 114 is power cycled the memory model 114 has random values at respective memory locations corresponding to power cycling the fabricated memory based on the memory model 114. Each memory location of the memory model 114 may store one or more bits, such as a zero or a one. In other examples, each memory location of the memory model 114 may contain an X value representative of an unknown or uninitialized value. The X value may be at least two-bits in size.

For example, to simulate data memory loss at the memory model 114, the random memory optimizer 118 can be programmed to receive write data 120. The write data 120 can be a given number of bits and can include one or more ones, zeros, or X values. The random memory optimizer 118 includes key output logic 122. The key output logic 122 can be programmed to provide a first key. The first key can be a similar or a different number of bits in size as the write data 120. The random memory optimizer 118 can include encrypt logic 124. The encrypt logic 124 can be programmed to receive the write data 120 and the first key and encode the write data according to the first key to provide encrypted write data.

The encrypted write data can be stored at a respective memory location in the memory model 114. In some examples, the write data 120 for each memory location in the memory model 114 can be encrypted according to a similar first key or a different first key. The random memory optimizer 118 can be programmed to store at all or a proper subset thereof memory locations in the memory model 114 corresponding write data that has been encrypted according to a respective first key. In some examples, the random memory optimizer 118 or the emulation tool 116 can be programmed to remove or cause power to be removed from the memory model 114. When power is removed from the memory model 114, the key output logic 122 can be programmed to retrieve from the key register a second key that is different from the first key. In some instances, the key output logic 122 can be programmed to retrieve the second key when power is restored to the memory model 114.

The random memory optimizer 118 further includes decrypt logic 126. When power is provided back to the memory model 114, the key output logic 122 can provide the second key to the decrypt logic 126. The decrypt logic 126 can be programmed to decrypt the encrypted write data at the respective location in the memory model 114 with the second key to provide decoded data 128. Because a different key is used to decrypt the encrypted data stored at the respective memory location in the memory model 114 this has the same effect as writing a random value to the respective memory location without doing a write operation to the respective memory location. Moreover, because the decoded data 128 has been unencrypted using a different key than the key with which the write data 120 was encrypted, the decoded data 128 does not match or equal the write data 120. Subsequent write data corresponding to the write data 120 in some examples can be encrypted according to the second key and stored at the one or more memory locations in the memory model 114. Data stored at all or the subset of memory locations in the memory model 114 can be decoded by the decrypt logic 126 using the second key and outputted as the decoded data 128, for example.

In further examples, the memory 106 includes a memory data evaluator 130. For instance, the memory data evaluator 130 can be invoked after a power cycle, such as by the random memory optimizer 118 or the emulation tool 116. As an example, the random memory optimizer 118 can invoke the memory data evaluator 130 in response to generating the decoded data 128 based on encrypted data stored at the respective memory location of the memory model 114. The memory data evaluator 130 can be programmed to receive the write data 120 and the decoded data 128. In some examples, the memory data evaluator 130 can be programmed to compare the write data 120 that is to be stored at a given memory location in the memory model 114 before a power cycle to the decoded data 128 after the power cycle. As described herein, the write data 120 stored at the given memory location can be encrypted according to the first key before power is removed from the memory model 114, and decoded according to the second key to provide the decoded data 128.

Because different keys have been used, the write data 120 does not match the decoded data 128 for the given memory location which can be indicative that a memory loss has occurred at the given memory location of the memory model 114. The memory data evaluator 130 can be programmed to output on an output device 132 (e.g., a display) data that indicates that memory loss has occurred at the given memory location of the memory model 114. In some instances, if the write data 120 matches the decoded data 128, the memory data evaluator 130 can be programmed to output data that indicates that no memory loss has occurred at the given memory location of the memory model 114. Accordingly, the random memory optimizer 118 can be programmed to randomize data stored in the memory model 114 with random values to simulate memory loss resulting from a power cycle of the memory.

Figure 2:
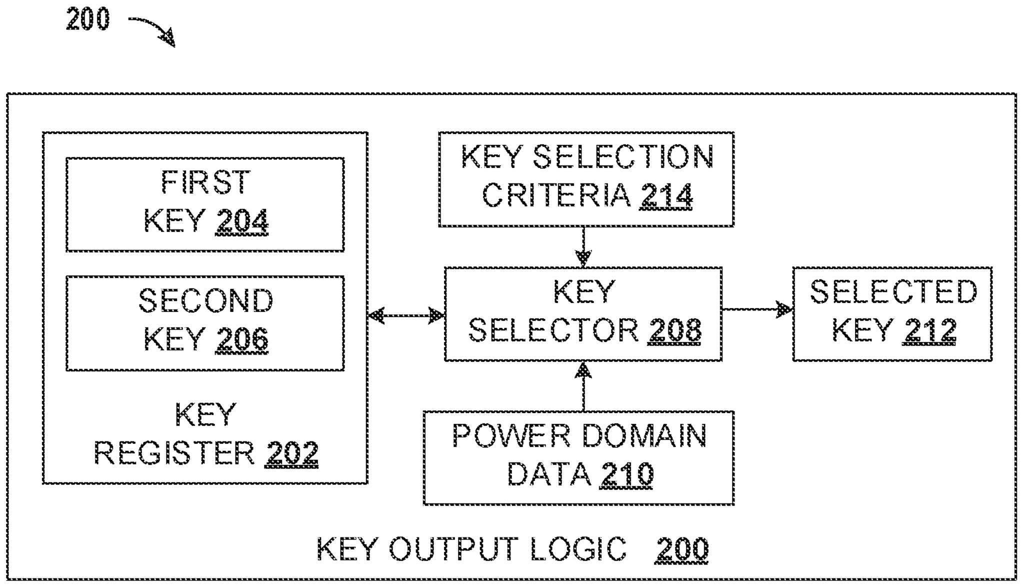
FIG. 2 illustrates an example of key output logic.

FIG. 2 illustrates an example of key output logic 200. The key output logic 200 can be representative of the key output logic 122, as shown in FIG. 1 in some instances. Thus, reference can be made to the example of FIG. 1 in the example of FIG. 2. The key output logic 200 can be programmed to output different keys for implementing memory randomization at the memory model 114, as shown in FIG. 1. As shown in FIG. 2, the key output logic 200 includes a key register 202. The key register 202 can store any number of keys such as a first key 204 and a second key 206. A select key can be employed for encrypting the write data 120 that is to be stored at a respective location in a memory model, such as the memory model 114, as shown in FIG. 1. As described herein, the first key 204 can be used to encrypt the write data 120 that is to be stored at the respective location of the memory model 114 before or before the memory model 114 is powered off. While the example of FIG. 2 illustrates using the key register 202 for providing different keys for encryption and decryption, in other examples, each key provided by the key register 202 can be generated by key generation logic. The key generation logic may generate each key for storage at the key register 202. In other examples, the key register 202 includes or is representative of the key generation logic and thus can provide corresponding keys for encryption and/or decryption as described herein.

For example, the key output logic 200 can include a key selector 208 that can be programmed to receive the first key from keys at the key register 202 in response to power domain data 210. In some instances, the key selector 208 can be programmed to cause the key register 202 to generate a corresponding key for selection or retrieval from the key register 202. The power domain data 210 may indicate that a power domain that includes the memory model 114 has not been powered off or indicate that the memory model 114 has not been powered off. Thus, in some instances, the power domain data 210 can indicate that the memory model 114 or the domain that includes the memory model 114 is receiving an operating voltage from a voltage source model of the user design model 102, as shown in FIG. 1. The key selector 208 can be programmed to provide the first selected as a selected key 212. In some instances, the key selector 208 can be programmed to provide the selected key 212 further based on key selection criteria 214. The key selection criteria 214 may identify a given key from the key register 202 that is to be used for encrypting and/or decrypting data for a given memory location in the memory model 114. In some instances, the key selection criteria may be organized as a table or according to a different data organization framework. The key selector 208 can be programmed to query the key register 202 for an appropriate key to provide as the selected key 212 before and after a power cycle. Each key identified by the key selection criteria 214 can be associated therein with a corresponding power domain and a power status (e.g., whether a corresponding power domain is powered or not powered).

By way of further example, the key selector 208 can be programmed to retrieve the first key 204 for encrypting the write data 120 based on the power domain data 210 identifying the power domain that includes the memory model 114 and indicating that power is being provided to the power domain that includes the memory model 114. In some instances, the key selector is programmed to retrieve the first key 204 further based on the key selection criteria 214. The key selection criteria 214 can identify the first key that is associated with a power status for the power domain. For the first key 204, the power status within the key selection criteria 214 for the power domain can indicate that the power domain is being powered. The key selector 208 can be programmed to determine that the power domain is being powered based on the power domain data 210. In response to determining that the power domain is being powered, the key selector 208 can identify the first key 204 for the power domain that includes the memory model 114 based on the key selection criteria 214. The key selector 208 in response to identifying the first key 204 can select or retrieve the first key 204 from the key register 202.

Continuing with the example of FIG. 2, if the selected key 212 is the first key 204, the first key 204 can be provided to the encrypt logic 124 to encrypt the write data 120 that is to be stored at the respective location of the memory model 114 before a power cycle. In some instances, the key generator logic 200 can be programmed to receive updated power domain data, referred to herein in such examples as the power domain data 210. The power domain data 210 may indicate that the power domain that includes the memory model 114 or the memory model 114 has been powered off. In other examples, the power domain data 210 may indicate that the power domain that includes the memory model 114 or the memory model 114 is to be powered off. The key selector 208 can be programmed to select or retrieve the second key 206 from the key register 202 based on the power domain data 210 and/or the key selection criteria 214. The key selection criteria 214 can indicate that the second key 206 is to be used for decrypting the write data 120 encrypted according to the first key 204 at the respective memory location following a power cycle of the memory model 114. When power is provided back to the memory model 114, the decrypt logic 126 can be programmed to decrypt the encrypted write data at the respective location in the memory model 114 with the second key 206 to provide the decoded data 128.

By way of further example, the key selector 208 can be programmed to retrieve the second key 206 for decrypting the encrypted write data based on the power domain data 210 identifying the power domain that includes the memory model 114 and indicating that power is not being provided to the power domain that includes the memory model 114. In some instances, the key selector is programmed to retrieve the second key 214 further based on the key selection criteria 214. The key selection criteria 214 can identify the second key that is associated with a power status for the power domain. For the second key 206, the power status for the power domain within the key selection criteria 214 can indicate that the power domain is not being powered on. The key selector 208 can be programmed to determine that the power domain is not being powered based on the power domain data 210. In response to determining that the power domain is not being powered, the key selector 208 can identify the second key 206 for the power domain that includes the memory model 114 based on the key selection criteria 214. The key selector 208 in response to identifying the second key 206 can select or retrieve the second key 206 from the key register 202. In some examples, the key selector 208 can query the key register 202 for each of the first and second keys 204 and 206.

Accordingly, different keys can be used to encrypt and decrypt memory data which has the same effect as writing a random value to the respective memory location without doing a write operation to the respective memory location at the memory model 114.

Figure 3:
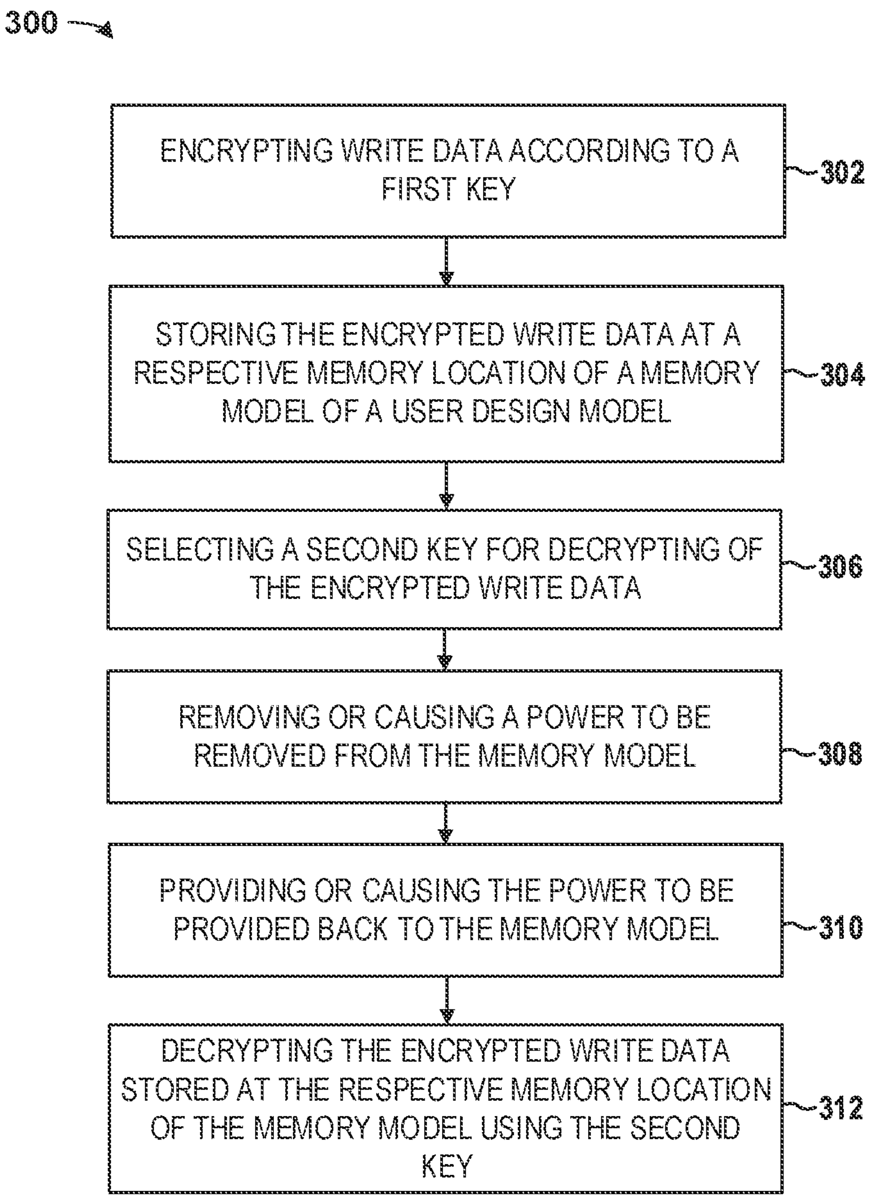
FIG. 3 illustrates an example of a method for memory randomization of a memory model during functional verification of a user design model.

In view of the foregoing structural and functional features described above, an example method will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples occur in different orders, multiple times and/or concurrently from that shown and described herein.

Moreover, it is not necessary that all described actions be performed to implement the method.

FIG. 3 illustrates an example of a method 300 for memory randomization of a memory model during functional verification of a user design model. The method 300 can be implemented by the computing platform 104, as shown in FIG. 1. Therefore, reference can be made to the examples of FIGS. 1-2 in the example of FIG. 3. The method 300 can begin at 302 by encrypting (e.g., using the encrypt logic 124, as shown in FIG. 1) write data (e.g., the write data 120, as shown in FIG. 1) according to a first key (e.g., the first key 204, as shown in FIG. 2). The write data can be encrypted according to the first key before a power cycle of a memory model (e.g., the memory model 114, as shown in FIG. 1) at which the encrypted write data is to be stored. At 304, storing the encrypted write data at a respective memory location of the memory model of a user design model (e.g., the user design model 102, as shown in FIG. 1).

At 306, selecting (e.g., using the key selector 208, as shown in FIG. 2) a different key for decoding the write data stored at the respective memory location. The different key can correspond to the second key 206, as shown in FIG. 2. At 308, removing or causing a power to be removed for a given amount of time from the memory model to power cycle the memory model. At 310, providing or causing the power to be provided back to the memory model to power the memory model. At 312, decrypting (e.g., using the decrypt logic 126, as shown in FIG. 1) the encrypted write data that is stored at the respective memory location of the memory model using the second key to provide decoded data (e.g., the decoded data 128, as shown in FIG. 1). The decoded data is different from the write data which can indicate that a memory loss has occurred at the given memory location of the memory model following the power cycle of the memory model.

Figure 4:
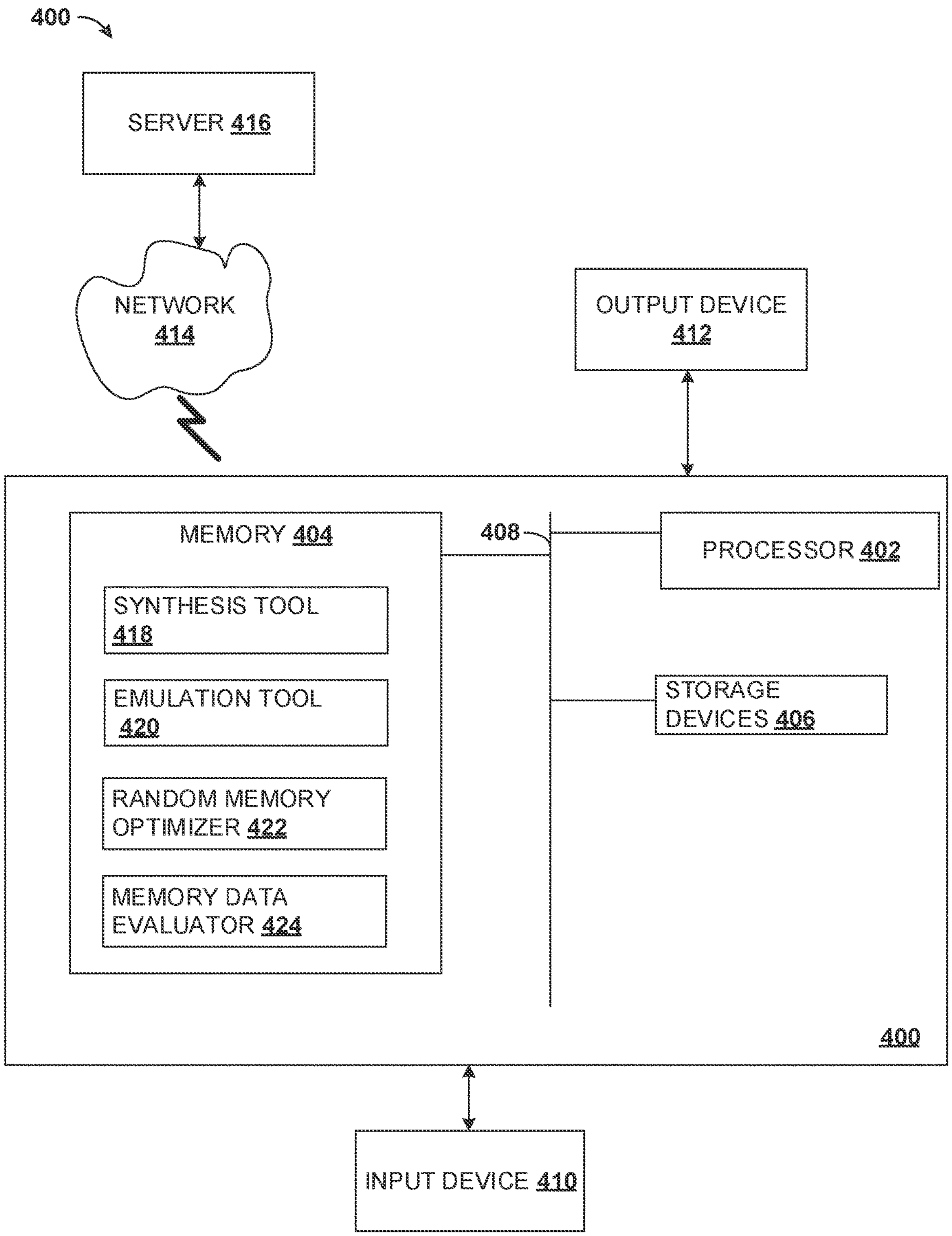
FIG. 4 illustrates an example of a computing system employable to execute memory randomization of a memory model during functional verification of a user design model.

The examples herein may be implemented on virtually any type of computing system regardless of the platform being used. For example, a computing system 400 may be one or more mobile devices (e.g., laptop computer, smart phone, personal digital assistant, tablet computer, or other mobile device), desktop computers, servers, blades in a server chassis, or any other type of computing device or devices that include at least the minimum processing power, memory and input and output device(s) to perform one or more embodiments. As shown in FIG. 4, the computing system 400 can include a computer processor 402, a memory 404 (e.g., RAM, cache memory, flash memory, etc.), one or more storage devices 406 (e.g., a solid state drive, a hard disk drive, an optical drive such as a compact disk (CD) drive or digital versatile disk (DVD) drive, a flash memory stick, etc.) and numerous other elements and functionalities. The computer processor 402 may be an IC for processing instructions. For example, the computer processor 402 may be one or more cores, or micro-cores of a processor. Components of the computing system 400 can communicate over a data bus 408.

The computing system 400 may also include an input device 410, such as any combination of one or more of a touchscreen, keyboard, mouse, microphone, touchpad, electronic pen, or any other input device. Further, the computing system 400 can include an output device 412, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 412 can be the same physical device as the input device 410. In other examples, the output device 412 and the input device 410 can be implemented as separate physical devices. The computing system 400 can be coupled to a network 414 (e.g., a local area network (LAN), a wide area network (WAN) such as the Internet, a mobile network, or any other type of network) via a network interface (not shown). The input device 410 and output device(s) 412 can be coupled locally and/or remotely (e.g., via the network 414) to the computer processor 402, the memory 404, and/or the storage device 406. Many different types of computing systems exist, and the input device 410 and the output device 412 can take other forms.

Software instructions in the form of computer readable program code to perform embodiments disclosed herein can be stored, in whole or in part, temporarily or permanently, on a non-transitory computer readable medium such as a CD, DVD, Blu-ray, storage device, a diskette, a tape, flash memory, physical memory, or any other computer readable storage medium. Specifically, the software instructions can correspond to computer readable program code that when executed by a processor, is configured to perform operations disclosed herein. The computing system 400 can communicate with a server 416 via the network 414.

The memory 404 can include a plurality of EDA applications that can be employed to generate an IC design and/or execute a simulation of the circuit design, and verification (e.g., functional verification). More particularly, the memory 404 can include a synthesis tool 418 (e.g., corresponding to the synthesis tool 112, as shown in FIG. 1), an emulation tool 420 (e.g., corresponding to the emulation tool 116, as shown in FIG. 1), a random memory optimizer 422 (e.g., corresponding to the random memory optimizer 118, as shown in FIG. 1), and a memory data evaluator 424 (e.g., corresponding to the memory data evaluator 130, as shown in FIG. 1). According to the examples described herein, the synthesis tool 418 can provide a user design model (e.g., the user design model 102, as shown in FIG. 1). The user design model can include at least one memory model, such as the memory model 114, as shown in FIG. 1. The user design model can be emulated by the emulation tool 420 in an emulation environment to verify a functionality of a user design based on the user design model. In some examples, during the emulation, a power cycle for the at least one memory model can be cycled. The random memory optimizer 422 can be employed (e.g., in some instances, by the emulation tool 420) to simulate memory loss in the at least one memory model as described herein.

Further, one or more elements of the computing system 400 can be located at a remote location and coupled to the other elements over the network 414. Additionally, some examples can be implemented on a distributed system having a plurality of nodes, where each portion of an embodiment can be located on a different node within the distributed system. In one example, the node in the example of FIG. 4 corresponds to a distinct computing device. Alternatively, the node can correspond to a computer processor with associated physical memory. The node can alternatively correspond to a computer processor or micro-core of a computer processor with shared memory and/or resources.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A computer-implemented method for memory randomization during functional verification of user design model comprising a memory model, the computer-implemented method comprising:

encrypting write data according to a first key before a power cycle of the memory model, wherein the memory model is representative of a random access memory (RAM);

storing the encrypted write data at a respective memory location of the memory model;

removing or causing power to be removed from the memory model to power cycle the memory model;

providing or causing the power to be provided back to the memory model to power the memory model;

retrieving a second key that is different from the first key that was used to encrypt data stored in the memory model;

decrypting the encrypted write data stored at the respective memory location of the memory model using the second key so as to provide decoded data that is different from the write data in response to the memory model being powered back on, and so as to emulate a condition where the removing or causing power to be removed from the memory model caused the contents of the RAM to be lost and randomized;

evaluating the write data and the decoded data to determine whether a memory loss has occurred at the respective memory location of the memory model following the power cycle of the memory model, wherein the evaluating comprises comparing the write data and the decoded data to determine whether the write data matches the decoded data;

retrieving the first key for encrypting the write data based on power domain data, the power domain data identifying a power domain that includes the memory model from a set of power domains for the user design model, and indicating that power is being provided to the power domain that includes the memory model, wherein the first key for encrypting the write data is further retrieved based on key selection criteria, the key selection criteria identifying the first key, and that the power domain is currently being powered, and wherein retrieving the second key for decrypting the encrypted write data is based on updated power domain data received in response to the power cycle, the updated power domain data identifying the power domain that includes the memory model, and indicating that power is not being currently being provided to the domain that includes the memory model, and wherein the second key for decrypting the encrypted write data is further retrieved based on the key selection criteria, the key selection criteria identifying the second key, and that the power domain is not currently being powered, and wherein the first and second keys are provided from a key register that comprises a plurality of keys including the first and second keys, and wherein the first and second keys are selected from the key register based on the key selection criteria and the power domain data.

2. The computer-implemented method of claim 1, further comprising generating memory loss data indicating that a memory loss has occurred at the respective memory location of the memory model following the power cycle of the memory model based on the comparison indicating that the write data does not match the decoded data.

3. The computer-implemented method of claim 1, further comprising generating memory loss data indicating that a memory loss has not occurred at the respective memory location of the memory model following the power cycle of the memory model based on the comparison indicating that the write data matches the decoded data.

4. The computer-implemented method of claim 1, wherein each of the first and second keys is retrieved from a key register comprising a plurality of different keys.

5. The computer-implemented method of claim 1, wherein encrypting of the write data is performed using encryption logic that produces encrypted data using a selected key and decrypting is performed using decryption logic that produces decrypted data that is the same as the write data when the selected key is used for decrypting.

6. A system comprising:

a non-transitory computer-readable medium configured to store data comprising a first key and a second key, and instructions;

a processor configured to access the non-transitory computer-readable medium and execute the instructions, the instructions comprising:

an emulation tool programmed to emulate a user design model comprising a memory model to emulate a functionality of the user design model, wherein the memory model is representative of a random access memory (RAM);

a random memory optimizer programmed to simulate data memory loss at the memory model during emulation of the user design model, the random memory optimizer being programmed to:

encrypt write data according to the first key for storage at a respective memory location of the memory model;

remove or cause power to be removed from the memory model to power cycle the memory model;

provide or cause the power to be provided back to the memory model to power the memory model;

retrieve the second key that is different from the first key that was used to encrypt data stored in the memory model; and decrypt the encrypted data stored at the respective memory location of the memory model using the second key so as to provide decoded data that is different from the write data in response to the memory model being powered back on, and so as to emulate a condition where the removing or causing power to be removed from the memory model caused the contents of the RAM to be lost and randomized; and a memory data evaluator that is programmed to:

evaluate the write data and the decoded data to determine whether a memory loss has occurred at the respective memory location of the memory model following the power cycle of the memory model; and generate memory loss data indicating that a memory loss has occurred at the respective memory location of the memory model based on the evaluation indicating that the write data does not match the decoded data, wherein the random memory optimizer comprises:

encrypt logic programmed to retrieve the first key based on power domain data, the power domain data identifying a power domain that includes the memory model from a set of power domains for the user design model, and indicating that power is being provided to the power domain that includes the memory model, the encrypt logic being further programmed to retrieve the first key based on key selection criteria, the key selection criteria identifying the first key, and that the power domain is currently being powered, the encrypt logic being further programmed to encrypt the write data according to the first key and store the encrypted write data at the respective memory location of the memory model;

decode logic programmed to retrieve the second key based on updated power domain data received in response to the power cycle, the updated power domain data identifying the power domain that includes the memory model, and indicating that power is not being provided to the power domain that includes the memory model, the decode logic being further programmed to retrieve the second key based on key selection criteria, the key selection criteria identifying the second key, and that the power domain is not currently being powered, the decode logic being further programmed to decrypt the encrypted data stored at the respective memory location of the memory model using the second key to provide the decoded data in response to the memory model being powered back; and key output logic programmed to provide the first and second keys, wherein the key output logic comprises:

a key register comprising a plurality of different keys that include the first and second keys; and a key selector being programmed to select one of the first and second keys based on key selection criteria and power domain data.

7. The system of claim 6, wherein the memory model is representative of a random access memory (RAM) model.

* * * * *